(12) United States Patent
Araujo et al.

(10) Patent No.: US 7,571,444 B2
(45) Date of Patent: Aug. 4, 2009

(54) METHOD, SYSTEM AND PROGRAM PRODUCT FOR MANAGING EVENTS

(75) Inventors: Carlos Cesar F. Araujo, Cary, NC (US); Jason H. Cornpropst, Mebane, NC (US); John E. Dinger, Cary, NC (US); Kevin A. Kizer, Apex, NC (US); Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 10/808,747

(22) Filed: Mar. 25, 2004

(65) Prior Publication Data

US 2005/0229183 A1    Oct. 13, 2005

(51) Int. Cl.
*G06F 13/00* (2006.01)
(52) U.S. Cl. ...................................... 719/318
(58) Field of Classification Search ................. 719/318
See application file for complete search history.

(56) References Cited

U.S. PATENT DOCUMENTS

| | | | |
|---|---|---|---|
| 6,185,613 B1 * | 2/2001 | Lawson et al. | 709/224 |
| 6,449,618 B1 * | 9/2002 | Blott et al. | 707/101 |
| 6,584,491 B1 * | 6/2003 | Niemi et al. | 709/202 |
| 7,117,504 B2 * | 10/2006 | Smith et al. | 719/328 |
| 7,313,534 B2 * | 12/2007 | Scheer | 705/9 |
| 2002/0129110 A1 * | 9/2002 | Liu et al. | 709/206 |
| 2004/0068568 A1 * | 4/2004 | Griffin et al. | 709/227 |

* cited by examiner

*Primary Examiner*—Andy Ho
(74) *Attorney, Agent, or Firm*—Hoffman Warnick LLC

(57) ABSTRACT

A highly reliable and readily scalable solution for managing events. In particular, an event is received and processed in a transaction. Any one of a plurality of event servers is selected to obtain event data based on the event and store the event data in an event data store. The event can be published to allow a subscribing event consumer to conduct further processing for the event data.

20 Claims, 4 Drawing Sheets

METHOD, SYSTEM AND PROGRAM PRODUCT FOR MANAGING EVENTS

BACKGROUND OF THE INVENTION

1. Technical Field

The invention relates generally to event management, and more particularly, to an improved solution for managing events using a plurality of stateless event servers.

2. Background Art

An event management solution (EMS) provides information (data) that allows operations staff to manage an information technology (IT) environment of one or more customers. In particular, the events and corresponding data generated within the IT environment can be monitored by the EMS to ensure that the various systems in the IT environment operate efficiently and effectively. This enables the EMS to provide the operations staff with timely warning of impending problems, notification of failing processes, identification of problem areas in a system, and the like. Further, the EMS may be able to automatically fix one or more problems before service availability for the IT environment falls below acceptable levels.

An EMS acts as an intermediary between a managed IT environment and one or more event consumers (e.g., management applications). In particular, the managed IT environment will include one or more event sources (e.g., managed objects) that produce events. An "event" comprises an individual data entity corresponding to some information communicated from an event source to an event consumer, i.e., from the managed environment to the management application. The event and its corresponding event data are sent to the EMS, from which the events are distributed to one or more interested event consumers. Further, the EMS can store the event data for later processing and/or access by an event consumer. In any event, the event consumer processes the event data. For example, an event consumer can comprise a server application which registers for, receives, and processes event data.

Due to the nature of customers, it is desirable that an event management solution perform without disruptions under high demand situations. Further, customers have requirements that are continually expanding and/or contracting. To this extent, the event management solution should be both reliable and scalable to readily meet a customer's needs.

However, current event management solutions either do not provide sufficient reliability or rely on expensive additional hardware and complicated solutions in order to provide the desired reliability. In the latter case, the solutions are not readily scalable due to the complex and expensive implementation. For example, some event management solutions require additional hardware such as a High Availability Cluster Multi-Processing (HACMP) environment, a hardware cluster, or the like. In these solutions, additional software may also be required to handle a server failure, such as standby backup systems, event forwarding rules from a primary server to a secondary server, etc. Despite this, when a disruption occurs, many of these solutions cannot guarantee that there will be no down time. In order to provide such a guarantee, some event management solutions incorporate systems that are more difficult and costly to maintain, deploy, and operate. Further, these systems often do not allow the solution to be readily scaled to meet the demands of a changing IT environment.

Additionally, many event management solutions can only be configured at the time that they are deployed (implemented). As a result, these solutions must be set up so that they are capable of processing peak demand situations, thereby increasing the cost of the solution. However, these processing capabilities exceed the requirements for the majority of the operating time. Further, when such a solution incorporates a backup system, the cost to scale up the system is substantially higher for the customer since the backup system should be upgraded as well.

In light of these limitations, current solutions generally do not completely meet the availability and/or scalability requirements for many customers. As a result, a need exists for an improved solution for managing events. In particular, a need exists for a method, system and program product that manages events using a plurality of stateless event servers.

SUMMARY OF THE INVENTION

The invention provides an improved solution for managing events. Specifically, under the present invention, an event is processed by a stateless event server. In particular, the event server does not store any state information on the progress of processing the event. Further, any event server in a set (one or more) of event servers can process any event. As a result, each event server can provide the same functionality, thereby providing an environment that is both highly reliable and readily scalable. To provide further reliability, events can be processed by each event server within transactions that allow partially processed events to be rolled back and reassigned to another event server for processing. Once an event is processed, it can be published by the event server for subsequent analysis and/or processing by a subscribing event consumer.

A first aspect of the invention provides a method of managing events in an information technology environment, the method comprising: receiving an event at a plurality of event servers; and processing the event using any one of the plurality of event servers, wherein the processing step comprises: starting a transaction for processing the event; obtaining event data based on the event; storing the event data in an event data store; publishing the event; and committing the transaction after the event is published.

A second aspect of the invention provides a method of managing events in an information technology environment, the method comprising: receiving an event from an event source; processing the event using any one of a plurality of stateless event servers; and providing event data for the event to an event consumer.

A third aspect of the invention provides a system for managing events in an information technology environment, the system comprising: an event data store for storing event data for an event; and a plurality of stateless event servers, wherein each stateless event server includes: a subscription system for processing a subscription request for the event; a communication system for receiving the event; and a processing system for processing the event.

A fourth aspect of the invention provides a program product stored on a recordable medium for managing events in an information technology environment, which when executed comprises: program code for receiving an event; program code for selecting any one of a plurality of event servers to process the event; and program code for processing the event using the selected event server, wherein the program code for processing includes: program code for starting a transaction; program code for obtaining event data based on the event; program code for storing the event data in an event data store; program code for publishing the event; and program code for committing the transaction after the event is published.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides an improved solution for managing events. Specifically, under the present invention, an event is processed by a stateless event server. In particular, the event server does not store any state information on the progress of processing the event. Further, any event server in a set (one or more) of event servers can process any event. As a result, each event server can provide the same functionality, thereby providing an environment that is both highly reliable and readily scalable. To provide further reliability, events can be processed by each event server within transactions that allow partially processed events to be rolled back and reassigned to another event server for processing. Once an event is processed, it can be published by the event server for subsequent analysis and/or processing by a subscribing event consumer.

Figure 1:
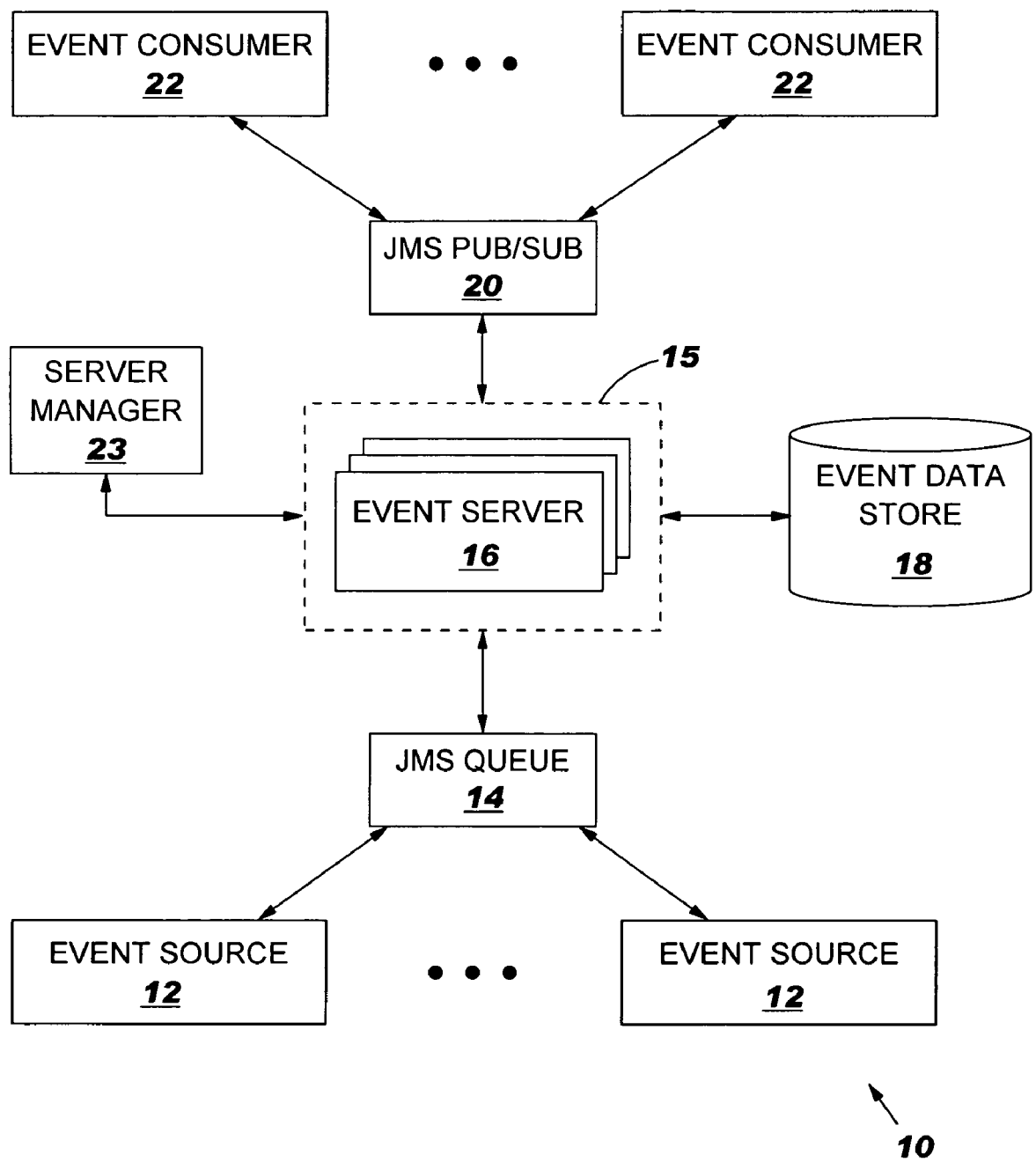
FIG. 1 shows an illustrative system for managing events.

Turning to the drawings, FIG. 1 shows an illustrative system 10 for managing events according to one embodiment of the invention. In general, system 10 includes a plurality of event sources 12 that generate events and communicate the events to a plurality of event servers 15. Any event server 16 can process the event to obtain event data, which is subsequently stored in event data store 18. Event data store 18 may comprise any type of data storage for providing storage for information (e.g., event data) necessary to carry out the invention as described herein. As such, event data store 18 may include one or more storage devices, such as a magnetic disk drive or an optical disk drive. In any event, an event server 16 can then communicate the event data to one or more event consumers 22, which process the event data.

In one embodiment, one or more of event servers 16 comprises a Websphere Application ServerÔ sold by International Business Machines Corp. of Armonk, N.Y. Further, event servers 16 can be executing a standard Java 2 Platform, Enterprise Edition (J2EE) application for processing the event. To this extent, events can be communicated from an event source 12 to event servers 16 using a Java Message Service (JMS) queue 14. Further, event data can be communicated from an event server 16 to one or more event consumers 22 using a JMS Publish/Subscribe (JMS Pub/Sub) 20 system.

System 10 is also shown including a server manager 23. Server manager 23 can manage plurality of event servers 15. In particular, server manager 23 can monitor the performance of each event server 16 to determine if the load on the currently dedicated event servers 16 is outside of acceptable limits. For example, server manager 23 may determine that plurality of event servers 15 cannot keep up with the amount of events being generated by event sources 12. In this case, server manager 23 can allocate one or more additional event servers 16 to plurality of event servers 15. Alternatively, server manager 23 may determine that one or more event servers 16 remains idle for an extended period of time. In this case, server manager 23 may preemptively remove one or more event servers 16 from plurality of event servers 15. To this extent, event sources 12 may be scaled up or down. In this case, server manager 23 may alter a number of event servers 16 that are allocated for processing events generated by event sources 12, rather than waiting for the demand to indicate a required adjustment. Because of the flexibility of system 10, one or more event servers 16 can be added/removed from plurality of event servers 15 without halting the services provided by system 10 (e.g., dynamically). Still further, server manager 23 may determine that event servers 16 are not processing events in an even manner. As a result, server manager 23 may alter the way that events are distributed to event servers 16 to process events more efficiently. For example, one event server 16 may process events slower than another event server 16. As a result, more events can be provided to the faster event server 16 for processing.

As is known in the art, communications between the various systems (i.e., event source(s) 12, event servers 16, event consumer(s) 22, event data store 18, etc.) can occur over any type of communications link, e.g., one or more networks. For example, a network can comprise an addressable connection in a client-server (or server-server) environment that may utilize any combination of wireline and/or wireless transmission methods. In this instance, the various systems may utilize conventional network connectivity, such as Token Ring, Ethernet, WiFi or other conventional communications standards. Further, the network can comprise any type of network, including the Internet, a wide area network (WAN), a local area network (LAN), a virtual private network (VPN), etc. Where communications occur via the Internet, connectivity could be provided by conventional TCP/IP sockets-based protocol, and one or more systems could utilize an Internet service provider to establish connectivity to another system. It is understood, however, that this is only illustrative of the various solutions that can be used according to the current invention.

Figure 2:
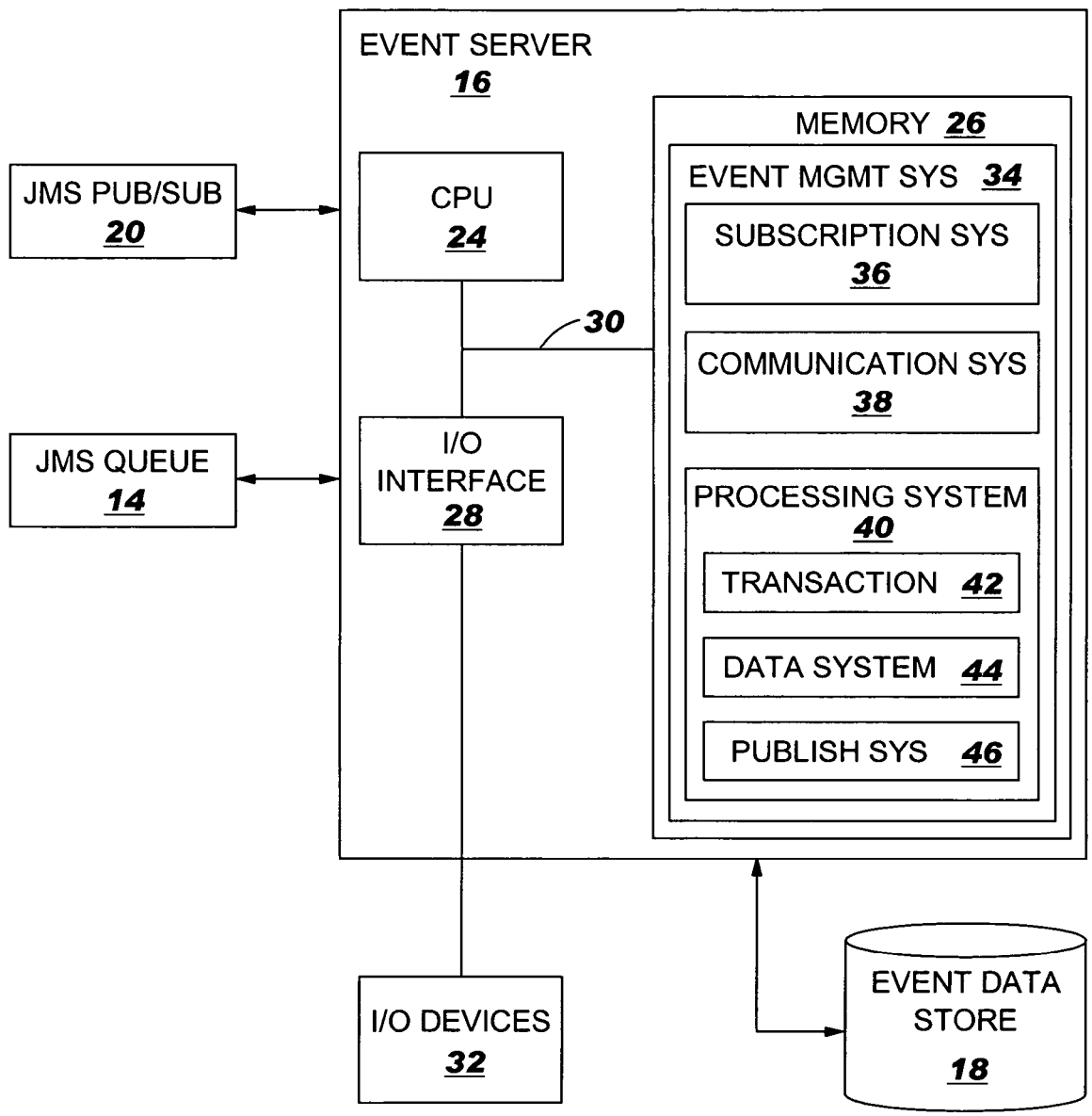
FIG. 2 shows a detailed view of the event server shown in FIG. 1.

FIG. 2 shows a more detailed view of an illustrative event server 16 shown in FIG. 1. In particular, event server 16 is shown including a central processing unit (CPU) 24, a memory 26, an input/output (I/O) interface 28, a bus 30, and external I/O devices/resources 32. CPU 24 may comprise a single processing unit, or be distributed across one or more processing units in one or more locations, e.g., on a client and server. Memory 26 may comprise any known type of data storage and/or transmission media, including magnetic media, optical media, random access memory (RAM), read-only memory (ROM), a data cache, a data object, etc. Moreover, similar to CPU 24, memory 26 and/or event data store 18 may reside at a single physical location, comprising one or more types of data storage, or be distributed across a plurality of physical systems in various forms. Further, memory 26 and/or event data store 18 can include data distributed across, for example, a LAN, WAN or a storage area network (SAN) (not shown).

I/O interface 28 may comprise any system for exchanging information to/from one or more external I/O devices 32. I/O devices 32 may comprise any known type of external device for providing and/or receiving information with one or more users and/or one or more other computing devices as are known in the art. Bus 30 provides a communication link between each of the components in event server 16 and likewise may comprise any known type of transmission link, including electrical, optical, wireless, etc. In addition, although not shown, additional components, such as system software, may be incorporated into event server 16.

As noted previously, it is understood that event server 16 comprises any type of computing device capable of communicating with one or more other computing devices (e.g., JMS Queue 14, JMS Pub/Sub 20, etc.). Similarly, the various other systems shown in FIGS. 1 and 2 can comprise any type of computing device, such as a server, a desktop computer, a laptop, a handheld device, a mobile phone, a pager, a personal data assistant, etc. To this extent, these systems typically include the same elements as shown in event server 16 (e.g., CPU, memory, I/O interface, etc.). These have not been separately shown and discussed for brevity. It is understood, however, that if any system is a handheld device or the like, a display or other I/O device 32 could be contained within the system, and not as an external I/O device 32 as shown for event server 16.

Memory 26 of event server 16 is shown including an event management system 34 for managing events generated in an IT environment. To this extent, event management system 34 is shown including a subscription system 36 for processing one or more subscription requests for events, a communication system 38 for receiving an event generated by an event source 12 (FIG. 1) and communicating event data to an event consumer 22 (FIG. 1), and a processing system 40 for processing the event. Further, processing system 40 is shown including a transaction system 42 for managing a transaction within which the event is processed, a data system 44 for obtaining event data based on the event, and a publish system 46 for publishing the event for processing by one or more event consumers 22. Operation of each of these systems will be discussed further below. It is understood, however, that some of the various systems shown in FIG. 2 can be implemented independently, combined, and/or stored in memory for one or more separate computing devices that communicate over a network. Further, it is understood that some of the systems and/or functionality may not be implemented, or additional systems and/or functionality may be included as part of system 10 (FIG. 1).

Figure 3:
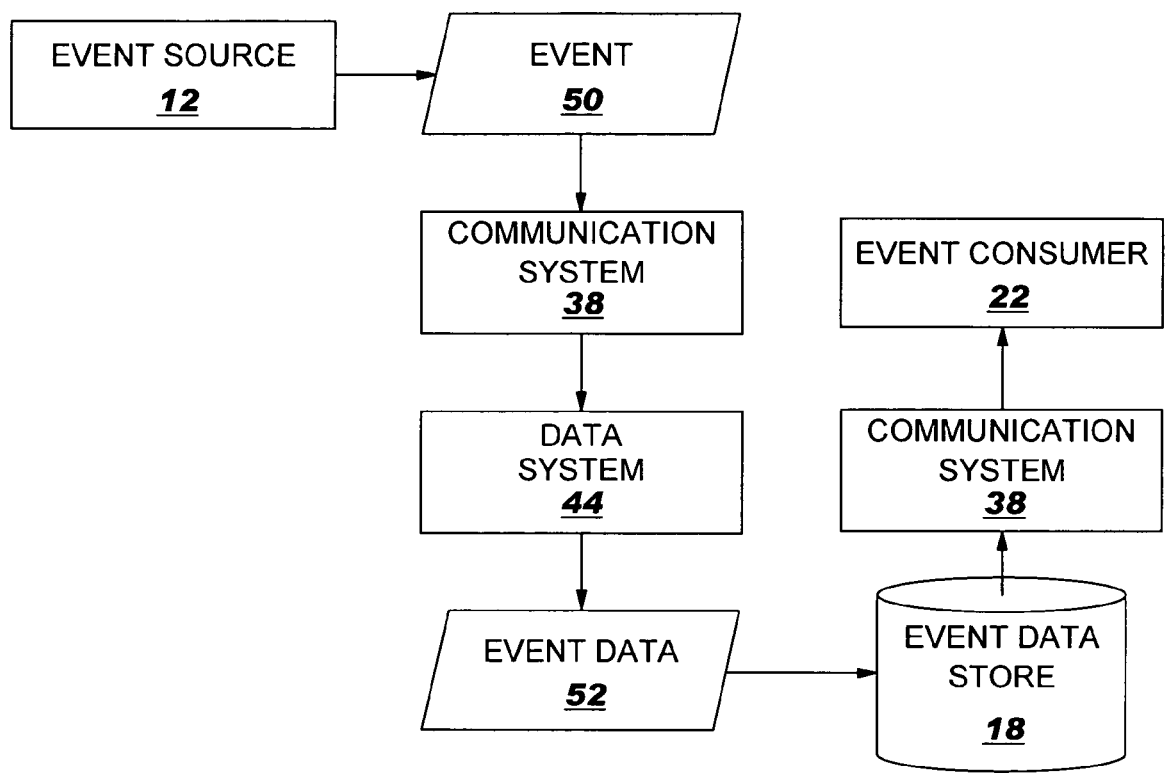
FIG. 3 shows an illustrative data flow diagram.

FIG. 3 shows an illustrative data flow diagram according to one embodiment of the invention. Initially, event source 12 generates an event 50. Event 50 can comprise any type of event. For example, event 50 could comprise a database operation (e.g., a table drop action), a network operation (e.g. a DDL action), a user operation, etc. In any event, event 50 is communicated to plurality of event servers 15 (FIG. 1). In one embodiment, event source 12 places event 50 on JMS queue 14 (FIG. 1). JMS queue 14 holds zero or more events 50 until one of the plurality of event servers 15 is available for processing event 50. When available, a particular event server 16 (FIG. 1) will access JMS queue 14 and obtain and process the next event 50 on JMS queue 14.

Event 50 can be received on event server 16 (FIG. 1) for processing using communication system 38. For example, as noted above, communication system 38 can interact with JMS queue 14 (FIG. 1) to obtain event 50. In any event, event 50 is provided to data system 44 for processing. Data system 44 can obtain event data 52 based on event 50. For example, event 50 may comprise data that includes both the type of event and its corresponding data. Alternatively, event 50 may identify a location where event data 52 is located. Regardless, once event data 52 is obtained, data system 44 can store event data 52 in event data store 18.

As noted above, plurality of event servers 15 (FIG. 1) must process events 50 efficiently and reliably. To prevent one or more events 50 from being unsuccessfully processed due to a failure of an event server 16 (FIG. 1), each event server 16 can process an event 50 in a transaction. In particular, data system 44 can initially start a transaction for processing event 50. During the transaction, data system 44 can obtain event data 52 and store event data 52 in event data store 18. Subsequently, the transaction can be committed. Further, each event server 16 can comprise a stateless event server. To this extent, event server 16 does not store any state information on processing events 50 on event server 16. Rather, any state information can be stored in event data store 18 or the like. As a result, any event server 16 can process any event 50. For example, when an event server 16 fails during the processing of event 50, the transaction can be rolled back, and event 50 can be provided to another event server 16 for processing.

Event data store 18 stores event data 52 for processing and/or future access by one or more event consumers 22. To this extent, communication system 38 can provide event data 52 for a newly processed event 50 to one or more event consumers 22. For example, communication system 38 can use a JMS pub/sub 20 (FIG. 1) to provide event data 52 to any interested event consumers 22. In this case, event consumer 22 can generate one or more subscription requests that are processed by an event server 16 (FIG. 1). The subscription request tells plurality of event servers 15 (FIG. 1) the events in which an event consumer 22 is interested. For example, event consumer 22 could comprise a database expert that subscribes to all database-specific events. Further, the subscription request could designate all instances of an event (e.g., all database writes), all events of a sub-category (e.g., all DDL actions), a customized category (e.g., event in management domain A and time stamped between 9 am and 5 pm, all events in a geographic region having a high priority, etc.), and the like.

In any event, communication system 38 on a particular event server 16 (FIG. 1) can receive a subscription request for event 50 from event consumer 22. Communication system 38 can provide the subscription request to subscription system 36 (FIG. 2) for processing. It is understood that subscription requests can be processed within a transaction similar to event 50. Once the subscription request is processed, event consumer 22 is notified anytime an event 50 that meets the criteria of the subscription request is processed by an event server 16. In particular, communication system 38 can provide event 50 to publish system 46 (FIG. 2), which publishes event 50. When event 50 is published, all event consumers 22 that have subscribed to event 50 are notified of the new event 50. Subsequently, each event consumer 22 can determine if it will process event 50.

Should event consumer 22 decide to process event 50, communication system 38 can provide event data 52 to event consumer 22. Event data 52 can be provided to event consumer(s) 22 when event 50 is published. Alternatively, event 50 can be published and each event consumer 22 that desires event data 52 can request it. Still further, event data 52 can be provided all at once, or only a portion of event data 52 can be requested and/or provided at a given time. When event 50 is processed in a transaction as discussed above, the transaction can be committed after event 50 is published, after event data 52 has been provided, or the like.

Figure 4:
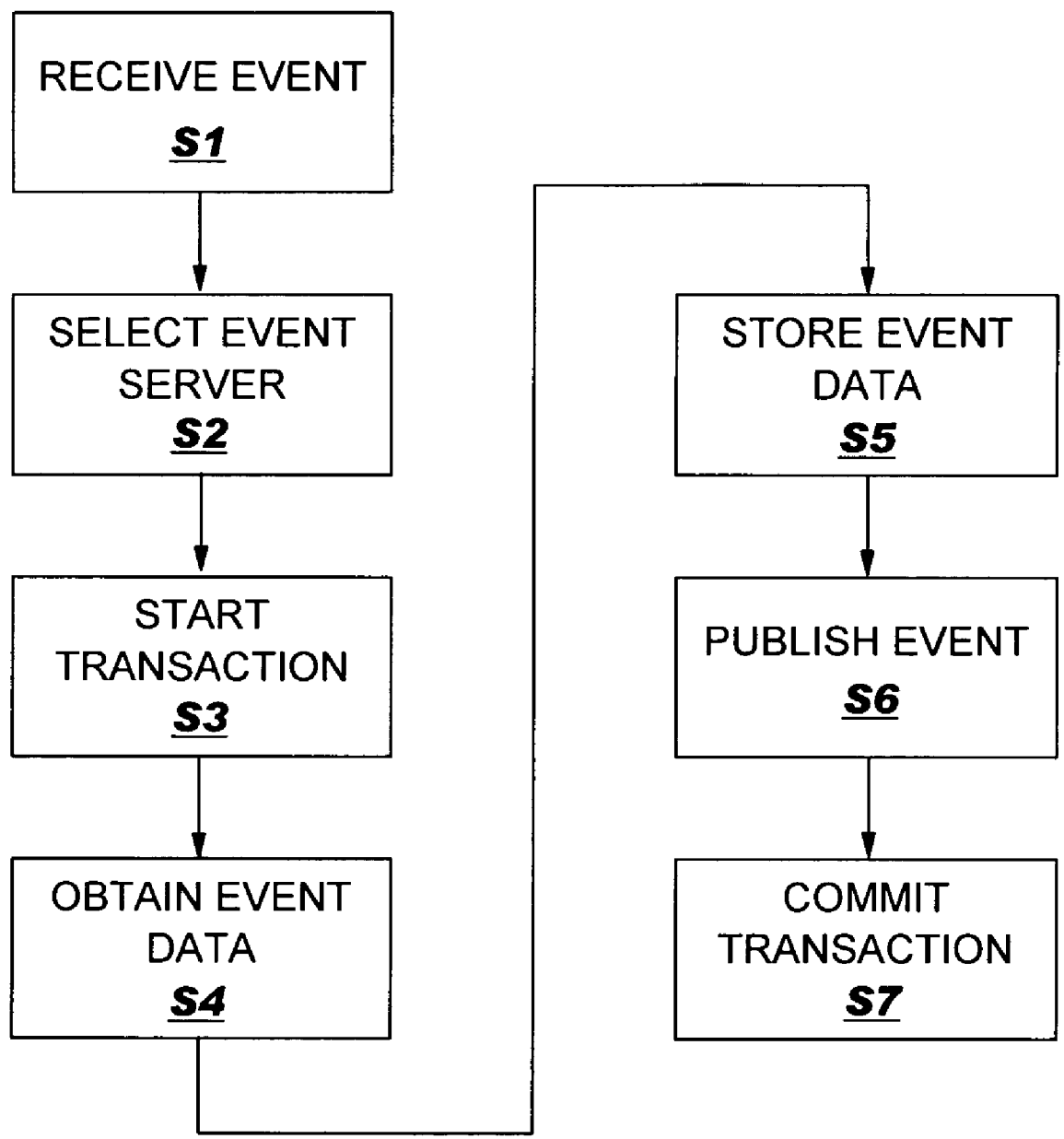
FIG. 4 shows illustrative method steps for processing an event.

For example, FIG. 4 shows illustrative method steps for processing an event 50 (FIG. 3) according to one embodiment of the invention. In step S1, an event 50 is received at, for example, JMS queue 14 (FIG. 1). In step S2, an event server 16 (FIG. 1) is selected for processing event 50. It is understood, that event server 16 can be selected using any solution, including, next available, round robin, etc. In any event, in step S3, event server 16 starts a transaction for processing event 50, and in step S4, event data 52 (FIG. 3) is obtained for event 50. In step S5, event data 52 is stored in event data store 18 (FIG. 1), and in step S6, event 50 is published. Once event 50 is published, in step S7, the transaction can be committed. Subsequently, one or more event consumers 22 (FIG. 1) may obtain event data 52 for further processing.

Returning to FIG. 1, after receiving event data 52 (FIG. 3), event consumer 22 processes event data 52. In particular, event consumer 22 can update data on the IT environment, make one or more adjustments to the IT environment based on event data 52, or the like. Further, event consumer 22 may add data, modify data, and/or delete data from event data 52. In this case, event consumer 22 can provide the updated/modified event data 52 to an event server 16 for updating/deleting event data 52 stored in event data store 18. It is understood that should event consumer 22 desire to modify event data 52, an event server 16 can process the request in a transaction as discussed above with reference to events 50.

The use of a plurality of event servers 15, transactions for performing the necessary processing on an event server 16 (e.g., receiving events, updating event data store 18, processing subscription requests, etc.), and/or storing state information apart from any event server 16 ensures that system 10 comprises a reliable event management solution. Further, system 10 can be readily scaled by adding or reducing event servers 16. Still further, system 10 can be incorporated within a hierarchy of event management solutions. In this case, event sources 12 could each comprise a different event management system that is being managed by system 10. To this extent, the hierarchy could be extended any number of levels based on the event management requirements. As a result, system 10 could comprise a portion of a larger event management solution that provides ready scaling and/or isolation through the hierarchy as well as the number of event servers 16 within each plurality of event servers 15.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer (e.g., a finite state machine), containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing events in an information technology environment, the method comprising:
   receiving an event at a plurality of stateless event servers, every event server being capable of publishing the event for all interested event consumers;
   selecting, without regard to an event source for the event and without regard to any event consumer for the event, any one of the plurality of stateless event servers to process the event, wherein every stateless event server does not locally store any state information on a progress of processing the event and any state information is stored in an event data store;
   processing the event using the selected one of the plurality of stateless event servers, wherein the processing comprises:
   starting a transaction for processing the event;
   obtaining event data based on the event;
   storing the event data in an event data store;
   publishing the event; and
   committing the transaction after the event is published.

2. The method of claim 1, further comprising:
   receiving a subscription request for the event from an event consumer; and
   processing the subscription request using any one of the plurality of event servers.

3. The method of claim 1, further comprising:
   receiving the event data at an event consumer; and
   processing the event data using the event consumer.

4. The method of claim 1, further comprising managing the plurality of event servers based on at least one of availability, scalability, and load balance for the information technology environment.

5. The method of claim 1, further comprising:
   generating the event at an event source; and
   communicating the event from the event source to the plurality of event servers.

6. A method of managing events in an information technology environment, the method comprising:
   receiving an event from an event source;
   selecting, without regard to the event, the event source, and any event consumer for the event, any one of a plurality of stateless event servers to process the event, wherein every stateless event server does not locally store any state information on a progress of processing the event and any state information is stored in an event data store;
   processing the event using the selected one of the plurality of stateless event servers; and
   providing event data for the event to an event consumer.

7. The method of claim 6, further comprising managing the plurality of stateless event servers based on at least one of availability, scalability, and load balance for the information technology environment.

8. The method of claim 6, further comprising:
   generating the event using the event source; and
   communicating the event from the event source to the plurality of stateless event servers.

9. The method of claim 6, further comprising subscribing to the event using the event consumer.

10. The method of claim 6, wherein the processing step comprises:
   obtaining event data based on the event;
   storing the event data in an event data store; and
   publishing the event.

11. The method of claim 10, wherein the processing step further comprises:
   starting a transaction for processing the event prior to the storing step; and
   committing the transaction after the publishing step.

12. A system for managing events in an information technology environment, the system comprising:
   an event data store for storing event data for an event; and
   a plurality of stateless event servers, wherein every stateless event server does not locally store any state information on a progress of processing the event and any state information is stored in an event data store, and without regard to the event, event source, and any event consumer for the event, wherein each stateless event server includes:
      a subscription system for processing a subscription request for the event;
      a communication system for receiving the event; and
      a processing system for processing the event, the processing system being capable of providing event data for the event to all interested event consumers.

13. The system of claim 12, wherein the processing system includes:
   a transaction system for managing a transaction within which the event is processed;
   a data system for obtaining event data based on the event; and
   a publish system for publishing the event.

14. The system of claim 13, further comprising an event consumer for processing the event data, wherein the communication system further communicates event data to the event consumer.

15. The system of claim 14, wherein the event data is communicated to the event consumer using Java Message Service Publish/Subscribe (JMS Pub/Sub).

16. The system of claim 12, further comprising an event source for generating the event.

17. The system of claim 16, wherein the event is communicated from the event source to the plurality of stateless event servers using a Java Message Service (JMS) queue.

18. The system of claim 12, wherein at least one of the plurality of stateless event servers comprises a standard Java 2 Platform, Enterprise Edition (J2EE) application executing on a Websphere Application Server.

19. A program product stored on a recordable medium for managing events in an information technology environment, which when executed comprises:
   program code for receiving an event;
   program code for selecting, without regard to the event source and without regard to any event consumer for the event, any one of a plurality of stateless event servers to process the event, every event server being capable of processing the event, wherein every stateless event server does not locally store any state information on a progress of processing the event and any state information is stored in an event data store; and
   program code for processing the event using the selected event server, wherein the program code for processing includes:
      program code for starting a transaction;
      program code for obtaining event data based on the event;
      program code for storing the event data in an event data store;
      program code for publishing the event; and
      program code for committing the transaction after the event is published.

20. The program product of claim 19, further comprising:
   program code for generating the event;
   program code for subscribing to the event; and
   program code for processing the event data.

* * * * *